United States Patent
Satoh et al.

(10) Patent No.: US 11,932,307 B2
(45) Date of Patent: Mar. 19, 2024

(54) STEERING CONTROL DEVICE AND STEERING CONTROL METHOD

(71) Applicant: ISUZU MOTORS LIMITED, Tokyo (JP)

(72) Inventors: Takahiro Satoh, Fujisawa (JP); Yuta Fujimaki, Fujisawa (JP); Ryota Okeya, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 383 days.

(21) Appl. No.: 16/956,493

(22) PCT Filed: Dec. 10, 2018

(86) PCT No.: PCT/JP2018/045209
§ 371 (c)(1),
(2) Date: Jun. 19, 2020

(87) PCT Pub. No.: WO2019/124125
PCT Pub. Date: Jun. 27, 2019

(65) Prior Publication Data
US 2021/0009204 A1    Jan. 14, 2021

(30) Foreign Application Priority Data

Dec. 20, 2017  (JP) ................................. 2017-243488

(51) Int. Cl.
*B62D 15/02*    (2006.01)
(52) U.S. Cl.
CPC ......... *B62D 15/025* (2013.01); *B62D 15/021* (2013.01)
(58) Field of Classification Search
CPC ............................ B62D 15/025; B62D 15/021
See application file for complete search history.

(56) References Cited

U.S. PATENT DOCUMENTS

| | | |
|---|---|---|
| 2006/0047390 A1 | 3/2006 | Scherl et al. |
| 2006/0217860 A1 | 9/2006 | Ihara |
| | (Continued) | |

FOREIGN PATENT DOCUMENTS

| | | |
|---|---|---|
| CN | 104703861 A | 6/2015 |
| CN | 107054361 A | 8/2017 |
| | (Continued) | |

OTHER PUBLICATIONS

The State Intellectual Property Office of People's Republic of China, The First Office Action, Application No. 201880082398.4, dated Nov. 24, 2021, in 10 pages.

(Continued)

*Primary Examiner* — Faris S Almatrahi
*Assistant Examiner* — Andrew J Cromer
(74) *Attorney, Agent, or Firm* — Procopio, Cory, Hargreaves & Savitch LLP

(57) ABSTRACT

A steering control device includes a distance calculation unit which calculates a distance between a front gaze point, which is on a straight line extending forward of a vehicle from a center of the vehicle, and a center line indicating the center of a lane where a vehicle is traveling, a steering angle detection unit which detects a steering angle of the vehicle, and a steering control unit which causes a motor, which assists steering of the vehicle, to assist the steering based on an angle formed by the lane and the straight line extending forward of the vehicle when the distance is larger than a predetermined distance, and causes the motor to assist the steering so as to fix the steering angle when the distance is the predetermined distance or smaller.

2 Claims, 3 Drawing Sheets

(56) References Cited

U.S. PATENT DOCUMENTS

| | | | |
|---|---|---|---|
| 2010/0228438 A1 | 9/2010 | Buerkle et al. | |
| 2013/0274985 A1 | 10/2013 | Lee et al. | |
| 2013/0321172 A1* | 12/2013 | Igarashi | G08G 1/167 340/905 |
| 2015/0217801 A1 | 8/2015 | Takeda | |
| 2015/0266508 A1* | 9/2015 | Yoshihata | B62D 15/025 701/41 |
| 2016/0334796 A1* | 11/2016 | Inoue | B60W 30/00 |
| 2017/0088168 A1 | 3/2017 | Oyama | |
| 2017/0355367 A1 | 12/2017 | Fu | |
| 2019/0168752 A1 | 6/2019 | Suzuki | |

FOREIGN PATENT DOCUMENTS

| | | |
|---|---|---|
| DE | 102006060628 A1 | 6/2008 |
| EP | 3495239 A1 | 2/2018 |
| JP | H10226350 A | 8/1998 |
| JP | H11189166 A | 7/1999 |
| JP | 2001-022444 A | 1/2001 |
| JP | 2001048035 A | 2/2001 |
| JP | 2006264623 A | 10/2006 |
| JP | 2008068669 A | 3/2008 |
| JP | 2014080177 A | 5/2014 |
| JP | 2016-107658 A | 6/2016 |
| JP | 2017047705 A | 3/2017 |
| JP | 2018025750 A1 | 2/2018 |
| WO | 2018025761 A1 | 2/2018 |
| WO | 2018025902 A1 | 2/2018 |

OTHER PUBLICATIONS

International Search Report and Written Opinion for related JP App. No. PCT/JP2018/045209 dated Feb. 12, 2019. English translation provided; 10 pages.

German Patent and Trademark Office, Office Action, Application No. DE 112018006479.4, dated Jun. 21, 2022, in 11 pages.

* cited by examiner

STEERING CONTROL DEVICE AND STEERING CONTROL METHOD

CROSS-REFERENCE TO RELATED APPLICATIONS

This application is a U.S. National Stage entry of PCT Application No. PCT/JP 2018/045209, filed on Dec. 10, 2018, which claims priority to JP Application No. JP 2017-243488, filed Dec. 20, 2017. The contents of the foregoing are incorporated by reference.

TECHNICAL FIELD

The present disclosure relates to a steering control device and a steering control method.

BACKGROUND ART

Steering is controlled so that a vehicle travels along a center position of a lane based on a lateral deviation between a traveling position of the vehicle and the center position of the lane where the vehicle travels (for example, see Patent Literature 1).

CITATION LIST

Patent Document

Patent Literature 1: JP-A-2006-264623

SUMMARY OF THE INVENTION

Technical Problem

In a case where the vehicle travels in the lane, time during which the lateral deviation occurs is longer than time during which the lateral deviation does not occur. Therefore, when the steering is controlled based on a lateral deviation amount even in a case where the lateral deviation amount is minute, a driver feels that the steering control is unnatural, or a behavior of the vehicle becomes unstable.

An object of the present disclosure is to provide a steering control device and a steering control method that enable to appropriately perform steering control.

Solution to Problem

The steering control device according to the present disclosure includes:
  a distance calculation unit that calculates a distance between a front gaze point, which is on a straight line extending forward of a vehicle from a center of the vehicle, and a center line indicating a center of a lane where the vehicle is traveling;
  a steering angle detection unit that detects a steering angle of the vehicle; and
  a steering control unit that causes a steering assistance unit to assist steering of the vehicle based on an angle formed by the lane and the straight line extending forward of the vehicle in a case where the distance is larger than a predetermined distance, and causes the steering assistance unit to assist steering so as to fix the steering angle in a case where the distance is the predetermined distance or smaller.

In a case where the distance is the predetermined distance or smaller, the steering control unit may control the steering assistance unit to fix the steering angle when the steering angle is larger than a first angle, and may control the steering assistance unit not to assist steering when the steering angle is within the first angle.

The steering control device may further includes an angular velocity detection unit that detects an angular velocity generated in the vehicle due to turning of the vehicle
  in which the steering control unit may specify a travel direction of the vehicle based on the detected angular velocity, and in a case where the distance is the predetermined distance or smaller, the steering control unit may cause the steering assistance unit to assist steering so as to fix the steering angle when a yaw angle of the vehicle is a second angle or larger and an angle formed by a straight line indicating the travel direction and the lane is within a third angle smaller than the first angle.

The steering control method executed by a computer according to the present disclosure includes:
  a step of calculating a distance between a front gaze point that is on a straight line extending forward of a vehicle from a center of the vehicle and a center line indicating a center of a lane where the vehicle is traveling;
  a step of detecting a steering angle of the vehicle; and
  a step of causing a steering assistance unit to assist steering of the vehicle based on an angle formed by the lane and the straight line extending forward of the vehicle in a case where the distance is larger than a predetermined distance, and causing the steering assistance unit to assist steering so as to fix the steering angle in a case where the distance is the predetermined distance or smaller.

Advantageous Effects of Invention

According to the present disclosure, it is possible to perform the control steering appropriately.

DESCRIPTION OF EMBODIMENTS

Figure 1:
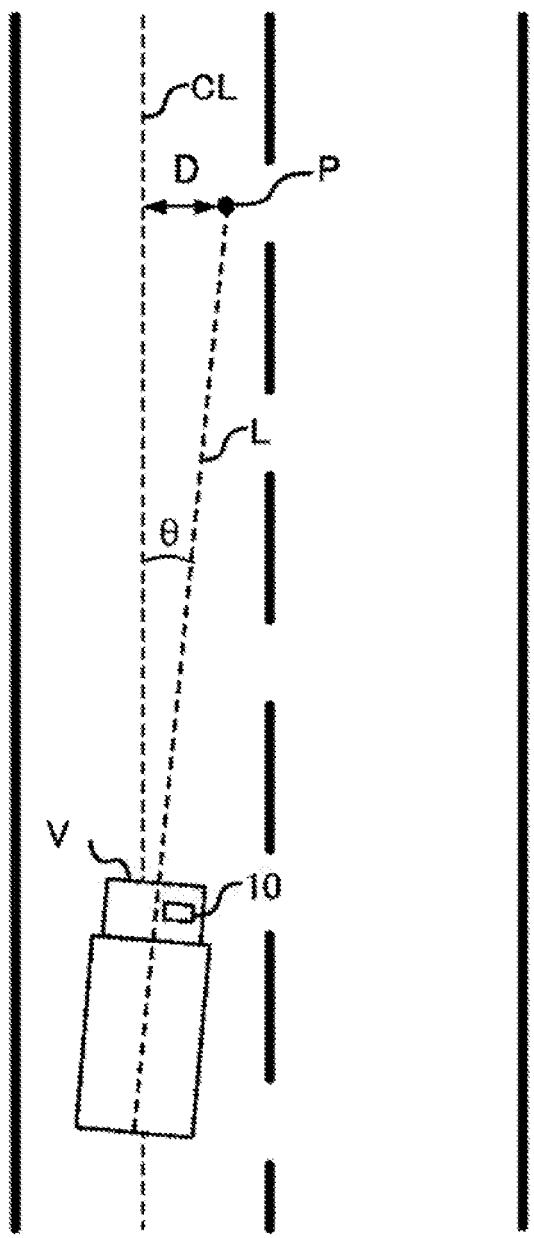
FIG. 1 illustrates an outline of a steering control device according to an embodiment.

[Outline of Steering Control Device]
FIG. 1 illustrates an outline of a steering control device according to an embodiment. A steering control device 10 illustrated in FIG. 1, for example, controls steering of a large vehicle V which is a bus, a track, or the like. The vehicle V may be a tractor to which a trailer is connected.

The steering control device 10 specifies a center line CL indicating a center of a lane where the vehicle V is traveling. The steering control device 10 specifies a front gaze point P that is on a straight line L extending forward of the vehicle V from a center of the vehicle V. The steering control device 10 calculates a distance D between the front gaze point P and the center line CL. Here, the center of the vehicle V is, for example, an intermediate position of the vehicle in a longitudinal direction of the vehicle. In a case where it is assumed that a weight balance of the vehicle V is biased to one side of the vehicle in a vehicle width direction or biased to either front or rear of the vehicle in the longitudinal direction of the vehicle, the center of the vehicle V may be set as a center of gravity of the vehicle V.

The steering control device 10 controls steering based on an angle θ formed by the lane where the vehicle V is traveling and the straight line L extending forward of the vehicle V, in a case where the calculated distance D is larger than a predetermined distance X. The steering control device 10 controls steering so as to fix a current steering angle of the vehicle V, in a case where the calculated distance D is the predetermined distance X or smaller.

Accordingly, the steering control device 10 can prevent the driver from feeling that the steering control is unnatural, stabilize a behavior of the vehicle V, and can appropriately perform the steering control.

[Configuration of Steering Control Device]

Figure 2:
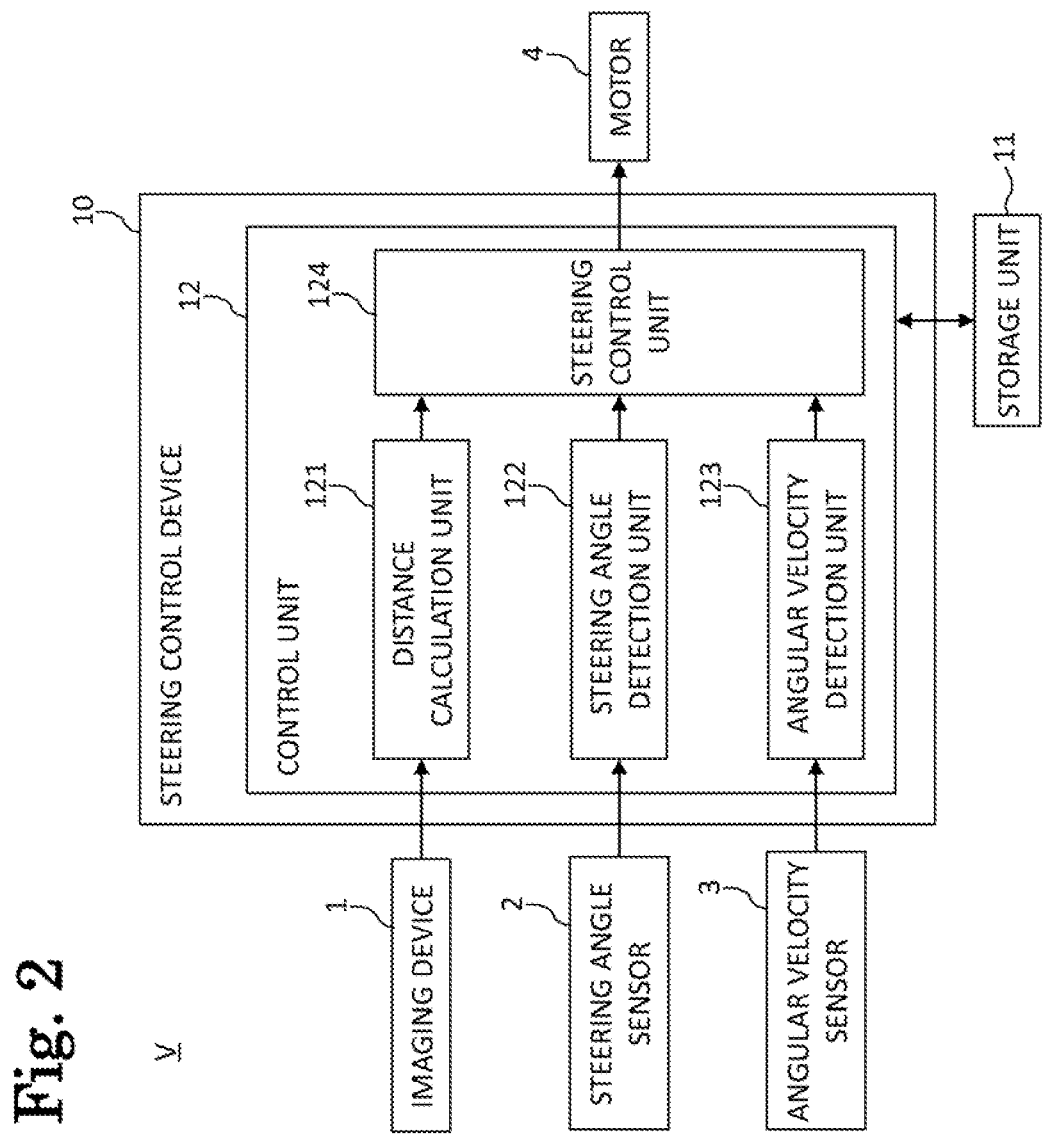
FIG. 2 shows a configuration of the steering control device according to the embodiment.

FIG. 2 shows a configuration of the steering control device according to the present embodiment.

As shown in FIG. 2, the steering control device 10 is electrically connected to an imaging device 1, a steering angle sensor 2, an angular velocity sensor 3, and a motor 4 that are provided in the vehicle V.

The imaging device 1 images front of the vehicle V in a travel direction of the vehicle V that includes the lane where the vehicle V travels at predetermined time intervals (for example, 10 milliseconds). The imaging device 1 outputs an imaged image to the steering control device 10.

The steering angle sensor 2 is provided, for example, on a steering shaft (not shown) of the vehicle V. and detects a steering angle of a steering wheel (not shown) connected to the steering shaft. The steering angle sensor 2 outputs steering angle information indicating an absolute value of the detected steering angle and a steering direction to the steering control device 10.

The angular velocity sensor 3 detects an angular velocity generated in the vehicle V due to turning of the vehicle V. The angular velocity sensor 3 outputs angular velocity information indicating the detected angular velocity to the steering control device 10.

The motor 4 is provided on a steering shaft of the vehicle V. The motor 4 is rotationally driven by electric power supplied from the steering control device 10 to apply an assistance torque (a steering assistance force) to the steering shaft to assist steering operation of the driver. The motor 4 functions as a steering assistance unit that assists steering for the vehicle V to travel along a traveling lane.

The steering control device 10 includes a storage unit 11 and a control unit 12.

The storage unit 11 is, for example, a read only memory (ROM), a random access memory (RAM), or a hard disk. The storage unit 11 stores various programs for causing the control unit 12 to function. The storage unit 11 stores a steering control program that causes the control unit 12 to function as a distance calculation unit 121, a steering angle detection unit 122, an angular velocity detection unit 123, and a steering control unit 124.

The control unit 12 is, for example, a central processing unit (CPU). The control unit 12 functions as the distance calculation unit 121, the steering angle detection unit 122, the angular velocity detection unit 123, and the steering control unit 124 by executing the steering control program stored in the storage unit 11.

Hereinafter, for convenience of description, a direction parallel to the vehicle width direction of the vehicle V is referred to as an X axis, and a direction that is a longitudinal direction of a vehicle body of the vehicle V and is perpendicular to the X axis is referred to as a Y axis.

The distance calculation unit 121 calculates the distance D between the front gaze point P that is on the straight line L extending forward (in a Y axis direction) of the vehicle V from the center of the vehicle V in the vehicle width direction (in an X axis direction) and the center line CL indicating the center of the lane where the vehicle V is traveling. Specifically, the distance calculation unit 121 analyzes the imaged image output from the imaging device 1, and specifies a partition line indicating a left end and a right end of the lane where the vehicle V drawn on a road is traveling. The distance calculation unit 121 specifies the center line CL that passes between the two specified partition lines and divides the lane into two equal parts.

The distance calculation unit 121 is on the straight line L extending forward of the vehicle V from the center of the vehicle V in the vehicle width direction, and specifies a point having a predetermined distance from the vehicle V as the front gaze point P. The distance calculation unit 121 calculates the distance D between the specified front gaze point P and the center line CL. A position of the front gaze point P may change according to a speed of the vehicle V. For example, the distance calculation unit 121 may increase the distance between the front gaze point P and the vehicle V according to an increase in the speed of the vehicle V.

The steering angle detection unit 122 detects a steering angle of the vehicle V based on the steering angle information output from the steering angle sensor 2. The angular velocity detection unit 123 detects an angular velocity generated in the vehicle V based on the angular velocity information output from the angular velocity sensor 3.

The steering control unit 124 causes the motor 4 to assist steering by supplying electric power to the motor 4 and driving the motor 4 rotationally. Hereinafter, a method of controlling the motor 4 by the steering control unit 124 will be described in detail.

First, the steering control unit 124 determines whether the distance D calculated by the distance calculation unit 121 is larger than the predetermined distance X. When determining that the distance D is larger than the predetermined distance X, the steering control unit 124 calculates the angle θ between the lane where the vehicle V travels and the straight line L extending forward of the vehicle V. For example, the steering control unit 124 calculates the angle θ based on a distance between the vehicle V and the front gaze point P and the distance D. When the distance D is larger than the predetermined distance X, the steering control unit 124 supplies electric power to the motor 4 to cause the motor 4 to assist steering based on the angle θ.

Here, the steering control unit 124 may change the predetermined distance X according to the distance between the front gaze point P and the vehicle V when the distance between the front gaze point P and the vehicle V increases as the speed of the vehicle V increases. The steering control unit 124 may change the predetermined distance X based on the center of gravity of the vehicle V and a wheel base of the vehicle V.

When determining that the distance D is smaller than the predetermined distance X, the steering control unit 124 supplies electric power to the motor 4 to cause the motor 4 to assist steering so as to fix the steering angle of the vehicle V detected by the steering angle detection unit 122.

Here, in the case where the steering control unit 124 determines that the distance D is small than the predetermined distance X, when the steering angle detected by the steering angle detection unit 122 is larger than a first angle, the steering control unit 124 causes the motor 4 to assist steering so as to fix the steering angle, and when the steering angle detected by the steering angle detection unit 122 is within the first angle, the steering control unit 124 may control the motor 4 not to assist steering.

For example, in a case where the distance D is the predetermined distance X or smaller and the steering angle detected by the steering angle detection unit 122 is 0 degree, the steering control unit 124 may not supply electric power to the motor 4 and may control the motor 4 not to assist steering. Accordingly, the steering control device 10 does not control steering in a case where the steering angle is minute, and can prevent a user from feeling uncomfortable with the steering.

The road surface may be provided with a cant (a slope in a left-right direction) in consideration of drainage at a time of rainfall or the like. In this case, in order to cause the vehicle V to travel in parallel with the lane, it is desirable that the vehicle V travels while being turned. When the vehicle V travels while being turned, a straight line indicating the travel direction of the vehicle V deviates from a straight line indicating a front direction of the vehicle V by a yaw angle.

Thus, the steering control unit 124 specifies the travel direction of the vehicle V based on the angular velocity detected by the angular velocity detection unit 123. When determining that the distance D is the predetermined distance X or smaller, the steering control unit 124 calculates an angle $\theta'$ between the straight line indicating the travel direction of the vehicle V and the lane where the vehicle V travels. In a case where the yaw angle is a second angle or larger, the steering control unit 124 may cause the motor 4 to assist steering so as to fix the steering angle when the angle $\theta'$ is within a third angle smaller than the first angle. For example, in a case where the steering angle is $\theta$ or smaller, the steering control unit 124 may cause the motor 4 to assist steering so as to fix the steering angle when the yaw angle is generated by the second angle or larger due to turning and the travel direction of the vehicle V and the lane where the vehicle V travels are substantially parallel.

Accordingly, in a case where the travel direction of the vehicle deviates from the front direction of the vehicle V by the yaw angle due to turning, the steering control device 10 can fix the turning and reduce a burden on a driver.

[Flow of Processing of Steering Control Device]

Figure 3:
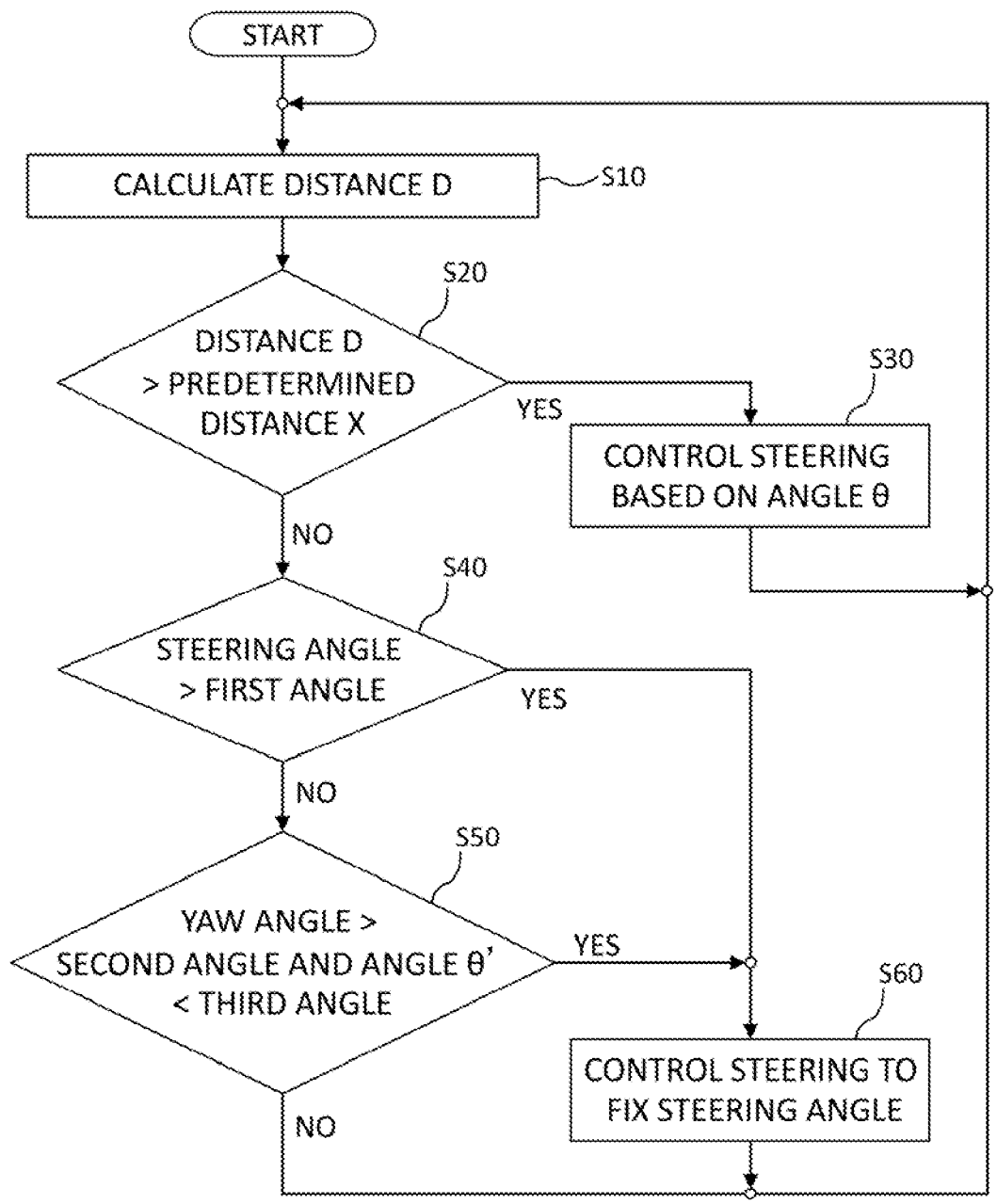
FIG. 3 is a flowchart showing a flow of processing of the steering control device according to the embodiment.

Next, a flow of processing of the steering control device 10 will be described. FIG. 3 is a flowchart showing a flow of processing of the steering control device 10.

First, the distance calculation unit 121 calculates the distance D between the front gaze point P and the center line CL indicating the center of the lane where the vehicle V is traveling (step S10).

Subsequently, the steering control unit 124 determines whether the calculated distance D is larger than the predetermined distance X (step S20). The steering control unit 124 moves the processing to step S30 when the distance D is larger than the predetermined distance X, and moves the processing to step S40 when the distance D is the predetermined distance X or smaller.

In step S30, the steering control unit 124 controls the motor 4 based on the angle $\theta$ between the lane where the vehicle V travels and the straight line L extending forward of the vehicle to cause the motor 4 to perform the steering control. When the processing of step S30 ends, the steering control unit 124 moves the processing to step S10.

In step S40, the steering control unit 124 determines whether the steering angle detected by the steering angle detection unit 122 is larger than the first angle. When determining that the steering angle is larger than the first angle, the steering control unit 124 moves the processing to step S60, and causes the motor 4 to assist steering so as to fix the steering angle. When determining that the steering angle is the first angle or smaller, the steering control unit 124 moves the processing to step S50.

In step S50, the steering control unit 124 determines whether the yaw angle of the vehicle V is larger than the second angle and the angle $\theta'$ is smaller than the third angle. Here, the angle $\theta'$ is formed by the straight line indicating the travel direction of the vehicle V specified based on the angular velocity detected by the angular velocity detection unit 123 and the lane where the vehicle V travels. When determining that the yaw angle is larger than the second angle and the angle $\theta'$ is smaller than the third angle, the steering control unit 124 moves the processing to step S60, and causes the motor 4 to assist steering so as to fix the steering angle. When determining that the yaw angle is the second angle or smaller or the angle $\theta'$ is the second angle or larger, the steering control unit 124 controls the motor 4 not to assist steering, and moves the processing to step S10.

[Effects according to Present Embodiment]

As described above, when the distance D between the front gaze point P of the vehicle V and the center of the lane where the vehicle V is traveling is larger than the predetermined distance X, the steering control device 10 according to the present embodiment causes the motor 4 to assist steering based on the angle $\theta$ formed by the lane and the straight line L extending forward of the vehicle V. and when the distance D is the predetermined distance X or smaller, the steering control device 10 according to the present embodiment causes the motor 4 to assist steering so as to fix the steering angle.

Accordingly, the steering control device 10 can prevent the driver from feeling that the steering control is unnatural, stabilize the behavior of the vehicle V, and can appropriately perform the steering control.

The present disclosure has been described using the embodiment. However, the technical scope of the present disclosure is not limited to the scope described in the above-described embodiment, and various modifications and changes can be made within the scope thereof. For example, a specific embodiment of distributing and integrating devices is not limited to the above-described embodiment, and all or a part thereof may be functionally or physically distributed and integrated in any unit.

The present application is based on a Japanese Patent Application (Japanese Patent Application No. 2017-243488) filed on Dec. 20, 2017, the contents of which are incorporated herein by reference.

INDUSTRIAL APPLICABILITY

The steering control device and the steering control method according to the present disclosure are useful in performing the steering control appropriately.

LIST OF REFERENCE NUMERALS

1 imaging device
2 steering angle sensor
3 angular velocity sensor
4 motor
10 steering control device
11 storage unit
12 control unit
121 distance calculation unit
122 steering angle detection unit 123 angular velocity detection unit
124 steering control unit
V vehicle

The invention claimed is:

1. A steering control device comprising:
a processor coupled to a memory storing instructions to permit the processor to function as:
a distance calculation unit that calculates a distance between a front gaze point, which is on a straight line extending forward of a vehicle from a center of the vehicle, and a center line indicating a center of a lane where the vehicle is traveling;
a steering angle detection unit that detects a steering angle of the vehicle; and
a steering control unit that causes a steering assistance unit to assist steering of the vehicle based on an angle formed by the lane and the straight line extending forward of the vehicle in a case where the distance is larger than a predetermined distance, and causes the steering assistance unit to assist steering so as to fix the steering angle in a case where the distance is the predetermined distance or smaller,
wherein, in a case where the distance is the predetermined distance or smaller, the steering control unit controls the steering assistance unit to fix the steering angle when the steering angle is larger than a first angle, and controls the steering assistance unit not to assist steering when the steering angle is within the first angle,
wherein the instructions further permits the processor to function as an angular velocity detection unit that detects an angular velocity generated in the vehicle due to turning of the vehicle, and
wherein the steering control unit specifies a travel direction of the vehicle based on the detected angular velocity, and in the case where the distance is the predetermined distance or smaller even when the steering angle is within the first angle, the steering control unit causes the steering assistance unit to assist steering so as to fix the steering angle to a current steering angle detected by the steering angle detection unit when a yaw angle of the vehicle is a second angle or larger, and an angle formed by a straight line indicating the travel direction and the lane is within a third angle smaller than the first angle, in which the specified travel direction of the vehicle deviates from a straight line indicating a front direction of the vehicle by the yaw angle.

2. A steering control method executed by a computer, the steering control method comprising:
calculating a distance between a front gaze point that is on a straight line extending forward of a vehicle from a center of the vehicle and a center line indicating a center of a lane where the vehicle is traveling;
detecting, by a steering angle detection unit, a steering angle of the vehicle;
causing a steering assistance unit to assist steering of the vehicle based on an angle formed by the lane and the straight line extending forward of the vehicle in a case where the distance is larger than a predetermined distance, and causing the steering assistance unit to assist steering so as to fix the steering angle in a case where the distance is the predetermined distance or smaller,
wherein, in a case where the distance is the predetermined distance or smaller, a steering control unit controls a steering assistance unit to fix the steering angle when the steering angle is larger than a first angle, and controls the steering assistance unit not to assist steering when the steering angle is within the first angle; and
detecting an angular velocity generated in the vehicle due to turning of the vehicle,
wherein the steering control unit specifies a travel direction of the vehicle based on the detected angular velocity, and in the case where the distance is the predetermined distance or smaller even when the steering angle is within the first angle, the steering control unit causes the steering assistance unit to assist steering so as to fix the steering angle to a current steering angle detected by the steering angle detection unit when a yaw angle of the vehicle is a second angle or larger, and an angle formed by a straight line indicating the travel direction and the lane is within a third angle smaller than the first angle, in which the specified travel direction of the vehicle deviates from a straight line indicating a front direction of the vehicle by the yaw angle.

* * * * *